United States Patent [19]

Kirchweger et al.

[11] 4,455,971
[45] Jun. 26, 1984

[54] WATER-COOLED INTERNAL COMBUSTION ENGINE WITH A SOUND ABSORBING COVER

[75] Inventors: Karl Kirchweger; Franz Knopf, both of Graz, Austria

[73] Assignee: Hans List, Graz, Austria

[21] Appl. No.: 396,701

[22] Filed: Jul. 9, 1982

[30] Foreign Application Priority Data

Jul. 14, 1981 [AT] Austria .................................. 3108/81

[51] Int. Cl.³ ............................................ F01P 1/02
[52] U.S. Cl. ................................ 123/41.7; 123/198 E; 181/204
[58] Field of Search ............... 123/41.7, 198 E, 195 C; 181/204, 205

[56] References Cited

U.S. PATENT DOCUMENTS

3,951,114  4/1976  Fachbach et al. ............... 123/198 E
4,164,262  8/1979  Skatsche et al. ................ 123/195 C
4,203,407  5/1980  Fachbach et al. ............... 123/198 E

FOREIGN PATENT DOCUMENTS

2835032  2/1979  Fed. Rep. of Germany .

*Primary Examiner*—William A. Cuchlinski, Jr.
*Attorney, Agent, or Firm*—Watson, Cole, Grindle & Watson

[57] ABSTRACT

In order to avoid the danger of overheating the separate exhaust jacket of a water-cooled internal combustion engine with a sound-absorbing cover whose enclosed space contains air inlet and outlet openings sealed against the penetration of sound, and is ventilated by cooling air during operation of the engine, and which has a separate exhaust jacket with air ducts of its own-with a radiator cooling fan being placed outside of the cover in the vicinity of a cover wall serving as a radial deflector for the outgoing air from the fan, and with the exhaust jacket leading substantially upwards from its outlet to its inlet opening-after the engine has been switched off and the forced ventilation has thus come to a standstill, the air inlet opening leading into the exhaust jacket is connected to the topmost part of this jacket and is positioned such as to be exposed to the flow of outgoing air from the fan.

10 Claims, 4 Drawing Figures

WATER-COOLED INTERNAL COMBUSTION ENGINE WITH A SOUND ABSORBING COVER

BACKGROUND OF THE INVENTION

The present invention relates to a water-cooled internal combustion engine with a sound-absorbing cover, the enclosed space being provided with air inlet and outlet openings sealed against the penetration of sound, and being ventilated by cooling air during operation of the internal combustion engine, and including an exhaust jacket which is separated from the remaining space of the cover and has separate air ducts, a radiator cooling fan being placed outside of the cover in the vicinity of a cover wall serving as a radial deflector for the outgoing air from the fan, and with the exhaust jacket substantially leading upwards from its outlet to its inlet opening.

DESCRIPTION OF THE PRIOR ART

An internal combustion engine of the above type, which is known for example from German laid-open print 28 35 032, is characterized by a sound-absorbing cover with forced ventilation from a fan attached to a pulley at the front end of the combustion engine. The exhaust jacket which in this known variant is added as a separate part outside of the engine cover proper, is supplied with cooling air from the cover through an annular gap formed between the wall of the jacket and the exhaust manifold. After having passed the main exhaust pipe which leads downwards out of the combustion engine and is surrounded by an absorption muffler, the cooling air leaves the separate exhaust jacket. Since the exhaust jacket is strongly heated by the hot main exhaust pipe or rather by the hot air from the exhaust pipe rising in the gap of the absorption muffler—especially after switching off the engine and thus the forced ventilation of the cover by the fan—an air vent will have to be provided at the highest point of the exhaust jacket, which is either open continuously (and will therefore require a sound-absorbing lining), or which is closed during operation of the engine by adjustable louvers and will be opened for ventilation of the exhaust jacket only after the engine has been switched off. In the first case, part of the cooling air will escape unused during operation of the engine, whereas in the latter case the adjustable louver system of the air vent will require considerable additional cost and design efforts.

SUMMARY OF THE INVENTION

It is an object of the present invention to avoid the above disadvantages of the known type of internal combustion engine and to ensure that the exhaust jacket is ventilated in a simple manner even after the internal combustion engine has been switched off.

According to the invention this is achieved by connecting the air inlet opening into the exhaust jacket with the topmost jacket area and by placing it such that it is exposed to the flow of cooling air going out from the radiator cooling fan. These measures will ensure that part of the air given off by the cooling fan during operation of the internal combustion engine will be directly used for ventilation and cooling of the exhaust jacket, which means that the exhaust jacket may be completely separate from the remaining space enclosed by the cover, and will require no blower of its own. In addition, connecting the air inlet opening into the exhaust jacket with the topmost area of the jacket and making the exhaust jacket rise between the air outlet and air inlet opening, will ensure in a simple way that the air heated in the exhaust jacket will steadily rise and leave the jacket via the air inlet opening after the internal combustion engine has been switched off, with the exhaust system still being heated. Besides simplifying ventilation of the exhaust jacket during operation of the internal combustion engine, the measures described by the present invention will result in a marked improvement even when the combustion engine is at a standstill.

An enhanced version of the invention envisages that the air inlet opening should be located at the top of the cover and that it should be provided with a corresponding air collector mounted on the outside of the surrounding cover wall. The collector may consist of suitably curved parts of sheet metal, collecting part of the off-air from the fan and conducting it towards the air inlet opening, which will raise the rate of cooling air passing through the exhaust jacket in a simple manner.

If an internal combustion engine designed according to the present invention is used for powering a motor vehicle, another proposal of the invention will be of particular advantage, according to which a muffler is placed at the air inlet opening outside of the cover and is—at least partly—made up of the neighboring vehicle parts, in analogy to the above air collector. In this way existing parts of the vehicle in the vicinity of the sound-absorbing cover of the internal combustion engine are utilized for improving and simplifying the ventilation system of the exhaust jacket, which will permit the driving engine to be mounted with greater ease, especially in motor trucks which usually have very little extra space.

DESCRIPTION OF THE DRAWINGS

Following is a more detailed description of preferred embodiments of the present invention, as illustrated by the schematic layouts enclosed, wherein.

DESCRIPTION OF THE PREFERRED EMBODIMENTS

Figure 1:
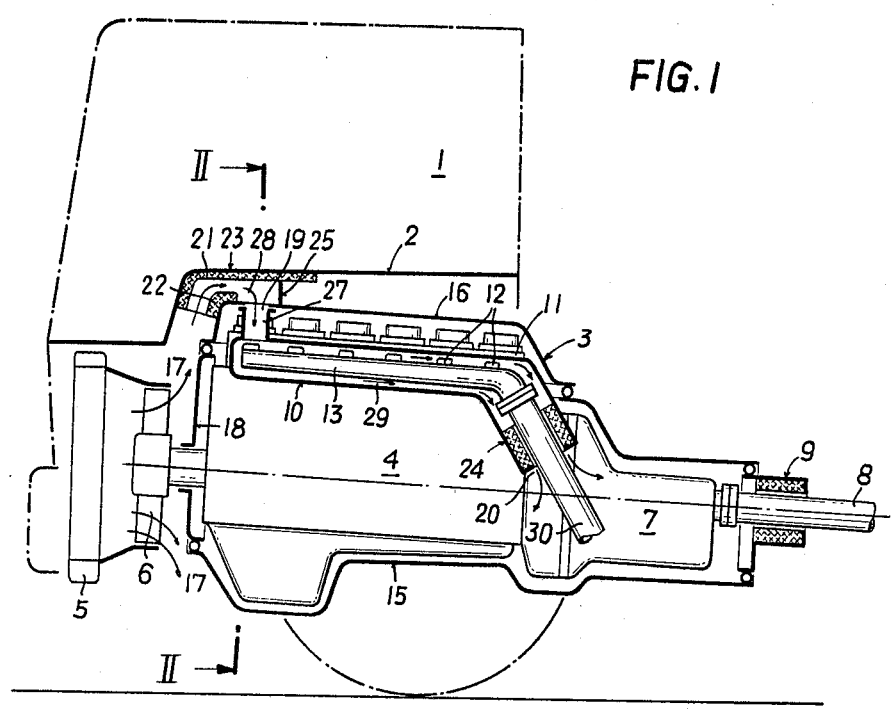
FIG. 1 is a partial longitudinal section through a motor truck driven by an internal combustion engine designed according to the invention.

According to FIG. 1 a motor truck 1 is driven by an internal combustion engine 4 placed beneath the floor 2 of the driver's cabin, which is provided with a sound-absorbing cover 3 and which is water-cooled by a radiator 5 and a radiator cooling fan 6. Together with the combustion engine 4, a gear-box 7 also is enclosed by the sound-absorbing cover 3, the passage of the output shaft 8 through the cover 3 being sealed against the penetration of sound by means of an absorption muffler 9.

Figure 2:
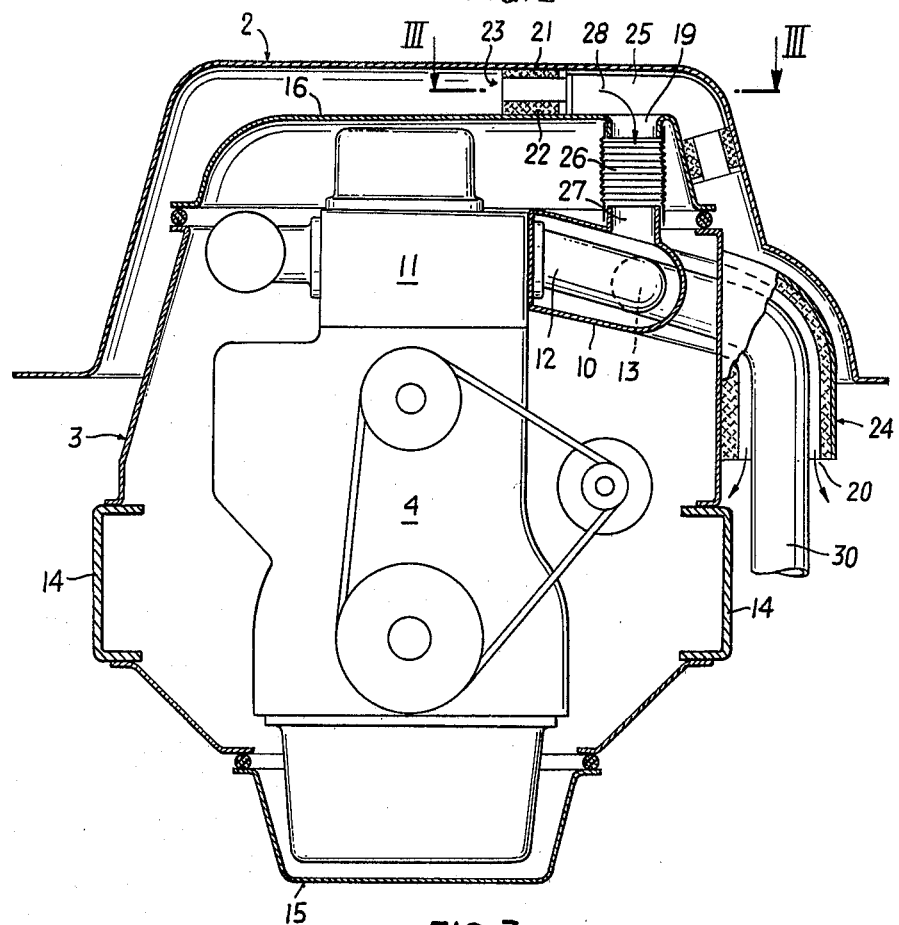
FIG. 2 is a partial cross-section along line II—II in FIG. 1, in an enlarged scale.

As is best shown in FIG. 2, the enclosed space of the cover 3 contains an exhaust jacket 10 separated from the remaining space, which in this variant is directly attached to the cylinder head 11 of the internal combustion engine 4, and which insulates the exhaust manifold 12 absorbing considerable heat during operation of the engine, as well as the main pipe 13, from those parts of the internal combustion engine which are situated in the remaining space enclosed by the cover. FIG. 2 also shows that the C-profile longitudinal spars 14 of the vehicle frame are an integral part of the sound-absorbing cover 3 whose top and bottom are provided with removable lids 15, 16 for maintenance purposes.

In the outgoing stream of air from the fan 6 whose direction is indicated by arrows 17 in FIG. 1 and which is flowing outwards radially on account of the special position of the fan 6 in the immediate vicinity of the front cover wall 18, an air inlet opening 19 into the exhaust jacket 10 is positioned on the upper side of the sound-absorbing cover 3, leading into the topmost area of the exhaust jacket 10 which is essentially downwards-directed from the air inlet opening to the air outlet opening 20. At the air inlet opening 19 a sound-absorbing material 21, 22 attached both to the outer wall of the cover 3 and to the area beneath the floor 2 of the driver's cabin, is used to form an absorption muffler 23 preventing the penetration of sound from the cover 3 at this point. The air outlet opening 20 is provided with an annular absorption muffler 24 in analogy to the one situated where the output shaft 8 passes through the wall of the cover.

Figure 3:
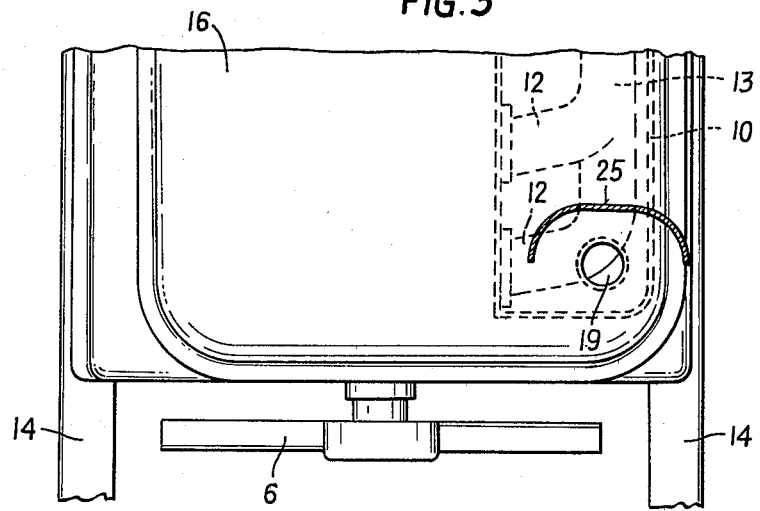
FIG. 3 is a partial section along line III—III in FIG. 2.

In the area of the air inlet opening 19 an air collector 25 (cf. FIG. 3) is locatd which consists of a curved guideplate between the top of the cover and the floor of the driver's cabin, and which collects part of the air from the fan flowing out in the direction of arrows 17, conducting it towards the air inlet opening 19. The air inlet opening is connected via a flexible hose 26 to the connecting piece 27 of the exhaust jacket 10, thereby causing that part of the outgoing air which has been collected by the air collector 25 to be fed into the exhaust jacket in the direction of arrow 28. Thus the exhaust jacket 10 is cooled as indicated by arrows 29 during operation of the internal combustion engine; at the lowest point of the exhaust jacket the cooling air flows out through the absorption muffler 24, or rather the annular gap between the muffler and the exhaust pipe 30.

During operation of the internal combustion engine the radiator cooling fan 6 will safeguard sufficient ventilation of the exhaust jacket without the use of an additional blower; in addition, ventilation of the exhaust jacket may be varied by placing and dimensioning the air collector 25 in a specific way. After the engine has been switched off, the air-flow inside the exhaust jacket 10 is reversed due to the effects of the heated parts of the exhaust system; outside air is taken in through the opening 20 and is subsequently heated inside the exhaust jacket 10 and is given off through the opening 19 and the adjoining absorption muffler 23. In this way the exhaust system of the internal combustion engine may be cooled in a simple way after the engine has been switched off, while avoiding losses during operation of the engine.

Figure 4:
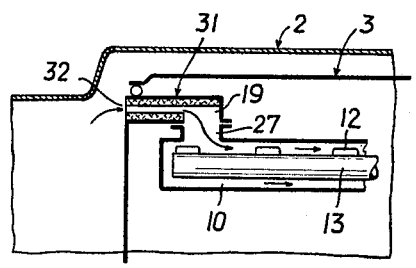
FIG. 4 is a partial section corresponding to FIG. 1, through another variant of the invention.

The detail from FIG. 4 shows the design of an absorption muffler 31 for the air inlet opening 19 into the exhaust jacket 10, the muffler being situated within the cover 3 of the internal combustion engine (not shown). The inlet opening 32 into the absorption muffler 31 is placed at the front wall of the cover 3, making for a more direct passage of the off-air from the fan (not shown in this drawing), and eliminating the need for a separate air collector. Other design details of this variant, which are now shown in FIG. 4, are similar to those discussed under FIGS. 1 to 3 and may therefore be omitted here. All the advantages of the present invention—above all those concerning the cooling system of the exhaust jacket—are maintained without any changes.

We claim:

1. A water-cooled internal combustion engine with a sound-absorbing cover, the space enclosed by said cover being provided with air inlet and outlet openings sealed against the penetration of sound and being ventilated by cooling air during operation of the internal combustion engine, said air inlet opening being located at the top of said cover and being provided with a corresponding air collector mounted on the outside of the surrounding cover wall, said engine including an exhaust jacket which is separated from the remaining space of said cover and has a separate cooling air duct, a radiator cooling fan being placed outside of said cover in the vicinity of a cover wall serving as a radial deflector for the outgoing air from said fan, and with said exhaust jacket substantially leading upwards from its outlet to its inlet opening, wherein said air inlet opening into said exhaust jacket is connected with the topmost jacket area and is placed such that it is exposed to the flow of cooling air going out from said fan.

2. An internal combustion engine as in claim 1, for powering a motor vehicle, wherein a muffler is placed at said air inlet opening outside of said cover, said muffler and said air collector being at least partly made up of neighboring vehicle parts.

3. A sound-insulated, water-cooled internal combustion engine which comprises (a) an internal combustion engine which includes an engine block, a cylinder head connected to the engine block, a radiator fan rotatably connected to the engine block, and an exhaust manifold connected to the cylinder head, the exhaust manifold including a main pipe having an upstream end and a downstream end and an exhaust pipe connected to the downstream end of the main pipe so as to extend downwardly with respect thereto, (b) a sound-absorbing cover enclosing the engine block, the cylinder head and the main pipe of the exhaust manifold, but not the radiator fan, the sound-absorbing cover including an air inlet opening located near the upsteam end of the main pipe and an outlet opening through which the exhaust pipe extends, (c) an exhaust jacket attached to the cylinder head so as to enclose the main pipe of the exhaust manifold and at least a portion of the exhaust pipe, the exhaust jacket including a connecting piece in its upper side near its upstream end which is connected to the air inlet opening in the sound-absorbing cover, and (d) first and second sound-insulating means respectively associated with the air inlet opening and the outlet opening in the sound-absorbing cover; cooling air emitted from the radiator fan during operation of the internal combustion engine passing in sequence through the first sound-insulating means, through the connecting piece, along the space between the exhaust jacket and the main pipe and exhaust pipe and out the outlet opening in the sound-absorbing cover so as to remove heat from the main pipe and the exhaust pipe, whereas when the operation of the internal combustion engine is discontinued, cooling air will pass in an opposite sequence to remove heat from the exhaust pipe and the main pipe.

4. The sound-insulating, water-cooled internal combustion engine as in claim 3, wherein the sound-absorbing cover includes an upper wall, side walls and a bottom wall, and wherein the air inlet opening is in its upper wall.

5. The sound-insulated, water-cooled internal combustion engine as in claim 3, wherein the second sound insulating means comprises an annular absorption muffler which is connected to the outside of the sound-absorbing cover and around the outlet opening therein so as to surround the exhaust pipe extending therethrough.

6. The sound-insulated, water-cooled internal combustion engine as in claim 3, wherein the first sound-insulating means comprises a sound-absorbing material connected to the outside of the sound-absorbing cover near the air inlet opening.

7. The sound-insulated, water-cooled internal combustion engine as in claim 6, wherein the engine is mounted below a floor of a truck cabin, and wherein the sound-absorbing material extends between the sound-absorbing cover and the floor.

8. The sound-insulated, water-cooled internal combustion engine as in claim 3, wherein an air defector is positioned against the outside of the sound-absorbing cover near the air inlet opening thereto to deflect cooling air from the radiator fan through the air inlet opening.

9. The sound-insulated, water-cooled internal combustion engine as in claim 3, wherein a flexible hose is connected between the air inlet opening in the sound-absorbing cover and the connecting piece of the exhaust jacket.

10. The sound-insulated, water-cooled internal combustion engine as in claim 3, wherein the main pipe of the exhaust manifold extends downwardly from its upstream end to its downstream end.

* * * * *